United States Patent [19]
Carpenter et al.

[11] Patent Number: 6,085,293
[45] Date of Patent: Jul. 4, 2000

[54] NON-UNIFORM MEMORY ACCESS (NUMA) DATA PROCESSING SYSTEM THAT DECREASES LATENCY BY EXPEDITING RERUN REQUESTS

[75] Inventors: Gary Dale Carpenter, Pflugerville; David Brian Glasco, Austin; Richard Nicholas Iachetta, Jr., Pflugerville, all of Tex.

[73] Assignee: International Business Machines Corporation, Armonk, N.Y.

[21] Appl. No.: 09/135,283

[22] Filed: Aug. 17, 1998

[51] Int. Cl.[7] .................................................. G06F 12/16
[52] U.S. Cl. .......................... 711/141; 711/122; 711/129; 711/130; 712/28
[58] Field of Search .................................... 711/141, 129, 711/130, 122; 712/28; 710/104

[56] References Cited

U.S. PATENT DOCUMENTS

| | | | |
|---|---|---|---|
| 5,673,413 | 9/1997 | Deshpande et al. | 711/141 |
| 5,878,268 | 3/1999 | Hagersten | 712/28 |
| 5,887,146 | 3/1999 | Baxter et al. | 710/104 |

*Primary Examiner*—John A. Follansbee
*Assistant Examiner*—Nabil El-Hady
*Attorney, Agent, or Firm*—Casimer K. Salys; Felsman, Bradley, Vaden, Gunter & Dillon, LLP

[57] ABSTRACT

A non-uniform memory access (NUMA) computer system includes a node interconnect and a plurality of processing nodes that each contain at least one processor, a local interconnect, a local system memory, and a node controller coupled to both a respective local interconnect and the node interconnect. According to the method of the present invention, a communication transaction is transmitted on the node interconnect from a local processing node to a remote processing node. In response to receipt of the communication transaction by the remote processing node, a response including a coherency response field is transmitted on the node interconnect from the remote processing node to the local processing node. In response to receipt of the response at the local processing node, a request is issued on the local interconnect of the local processing node concurrently with a determination of a coherency response indicated by the coherency response field.

3 Claims, 6 Drawing Sheets

NON-UNIFORM MEMORY ACCESS (NUMA) DATA PROCESSING SYSTEM THAT DECREASES LATENCY BY EXPEDITING RERUN REQUESTS

BACKGROUND OF THE INVENTION

1. Technical Field

The present invention relates in general to a method and system for data processing and, in particular, to a non-uniform memory access (NUMA) data processing system and method of communication in a NUMA data processing system. Still more particularly, the present invention relates to a NUMA data processing system and method of communication in which latency is decreased by efficiently handling responses received from remote processing nodes.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. Because all data accesses can potentially trigger a coherency or data request transaction on the nodal interconnect, the latency associated with the transmission of requests to remote nodes and transmission of the responses from the remote nodes can dramatically influence overall system performance. As should thus be apparent, it would be desirable to provide a CC-NUMA computer system having low inter-node communication latency.

SUMMARY OF THE INVENTION

It is therefore one object of the present invention to provide an improved method and system for data processing.

It is another object of the present invention to provide an improved NUMA data processing system and method of communication in a NUMA data processing system.

It is yet another object of the present invention to provide an improved NUMA data processing system and method of communication in which latency is decreased by efficiently handling responses received from remote processing nodes.

The foregoing objects are achieved as is now described. A non-uniform memory access (NUMA) computer system is provided, which includes a node interconnect and a plurality of processing nodes that each contain at least one processor, a local interconnect, a local system memory, and a node controller coupled to both a respective local interconnect and the node interconnect. According to the method of the present invention, a communication transaction is transmitted on the node interconnect from a local processing node to a remote processing node. In response to receipt of the communication transaction by the remote processing node, a response including a coherency response field is transmitted on the node interconnect from the remote processing node to the local processing node. In response to receipt of the response at the local processing node, a request is issued on the local interconnect of the local processing node concurrently with a determination of a coherency response indicated by the coherency response field.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
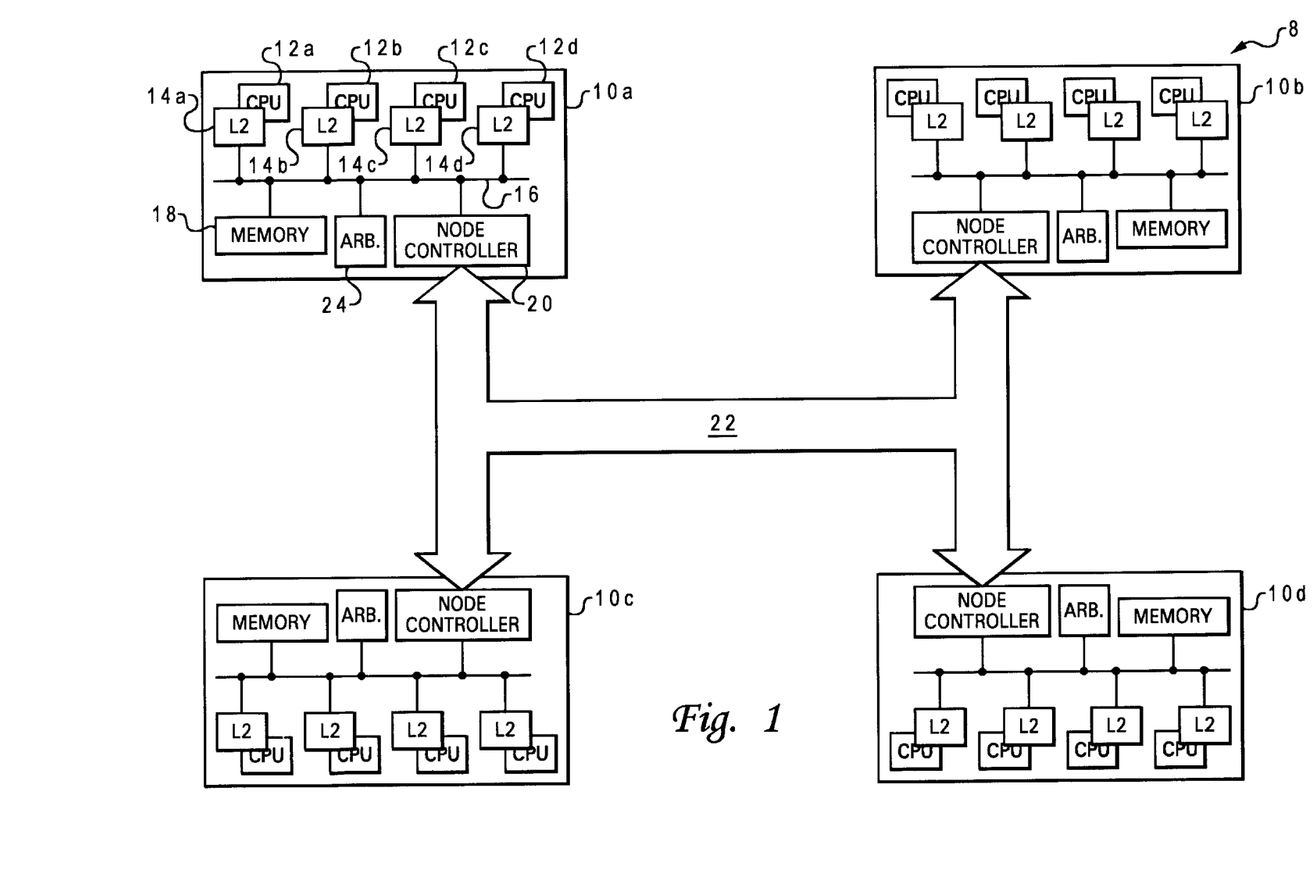
FIG. 1 depicts an illustrative embodiment of a NUMA computer system with which the present invention may advantageously be utilized.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 8 includes a number (N) of processing nodes 10a–10d, which are interconnected by node interconnect 22. Processing nodes 10a–10d each include at least one, and up to M, processors 12.

Processors 12a–12d are preferably identical and may comprise a processor within the PowerPC™ line of processors available from International Business Machines (IBM) Corporation of Armonk, New York. In addition to the registers, instruction flow logic and execution units utilized to execute program instructions, each of processors 12a–12d also includes an on-chip level one (L1) cache (not illustrated), which together with a respective one of level two (L2) caches 14a–14d is utilized to stage data to the associated processor 12 from system memories 18. In other words, the L1 caches and L2 caches 14a–14d function as intermediate storage between the system memories 18 and processors 12 that temporarily buffer data that are likely to be accessed by the associated processor 12. L2 caches 14 typically have a much larger storage capacity than the L1 caches, but at a longer access latency. For example, L2 caches 14a–14d may have a storage capacity of 1–16 megabytes (MB), while the on-chip L1 caches may have a storage capacity of 8–32 kilobytes. Although L2 caches 14a–14d are illustrated in FIG. 1 as external to processors 12, it should be understood that L2 caches 14a–14d could alternatively be incorporated within the associated processor 12 as an additional level of on-chip cache memory. Furthermore, it should be understood that one or more additional levels of cache memory (L3, L4, etc.) could be utilized to provide additional data storage. In the following discussion, each processor 12 and its associated cache hierarchy (L1, L2, etc.) is considered to be a single snooper.

As shown, processing nodes 10a–10d further include a respective node controller 20, which, together with system memory 18 and L2 caches 14a–14d, is coupled to local interconnect 16. Each node controller 20 serves as a local agent for remote processing nodes 10 by performing at least two functions. First, node controllers 20 snoop the associated local interconnect 16 and facilitate the transmission of local communication transactions to remote processing nodes 10. Second, node controllers 20 snoop communication transactions on node interconnect 22 and master relevant communication transactions on the associated local interconnect 16. Communication on each local interconnect 16 is controlled by an arbiter 24. As discussed further below, arbiters 24 regulate access to local interconnects 16 based on bus request signals generated by processors 12 and compile coherency responses for snooped communication transactions on local interconnects 16.

Of course, NUMA computer system 8 can further include additional devices that are not necessary for an understanding of the present invention and are accordingly omitted in order to avoid obscuring the present invention. For example, each node 10 may also support I/O devices (e.g., a display device, keyboard, or graphical pointer), non-volatile storage for storing an operating system and application software, and serial and parallel ports for connection to networks or attached devices.

Memory Organization

All of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. For example, for the illustrative embodiment of the present invention shown in FIG. 1, processors 12 address a 16 gigabyte (GB) address space including both a general purpose memory area and a reserved area. The general purpose memory area is divided into 500 MB segments, with each of the four processing nodes 10 being allocated every fourth segment. The reserved area, which may contain approximately 2 GB, includes system control and peripheral memory and I/O areas that are each allocated to a respective one of processing nodes 10.

For purposes of the present discussion, the processing node 10 that stores a particular datum in its system memory 18 is said to be the home node for that datum; conversely, others of processing nodes 10–10d are said to be remote nodes with respect to the particular datum.

Memory Coherency

Because data stored within each system memory 18 can be requested, accessed, and modified by any processor 12 within NUMA computer system 8, NUMA computer system 8 implements a cache coherency protocol to maintain coherency both between caches in the same processing node and between caches in different processing nodes. Thus, NUMA computer system 8 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that L1 caches, L2 caches 14b, and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 can each be implemented with any interconnect architecture, including a bus-based broadcast fabric, a switch-based broadcast fabric, or a switch-based fabric without broadcast. The present invention is equally applicable to each of these implementations; however, for purposes of illustration, each of local interconnects 16 and node interconnect 22 is depicted and described as a hybrid-bus architecture governed by the 6xx communication protocol developed by IBM Corporation.

Figure 2A:
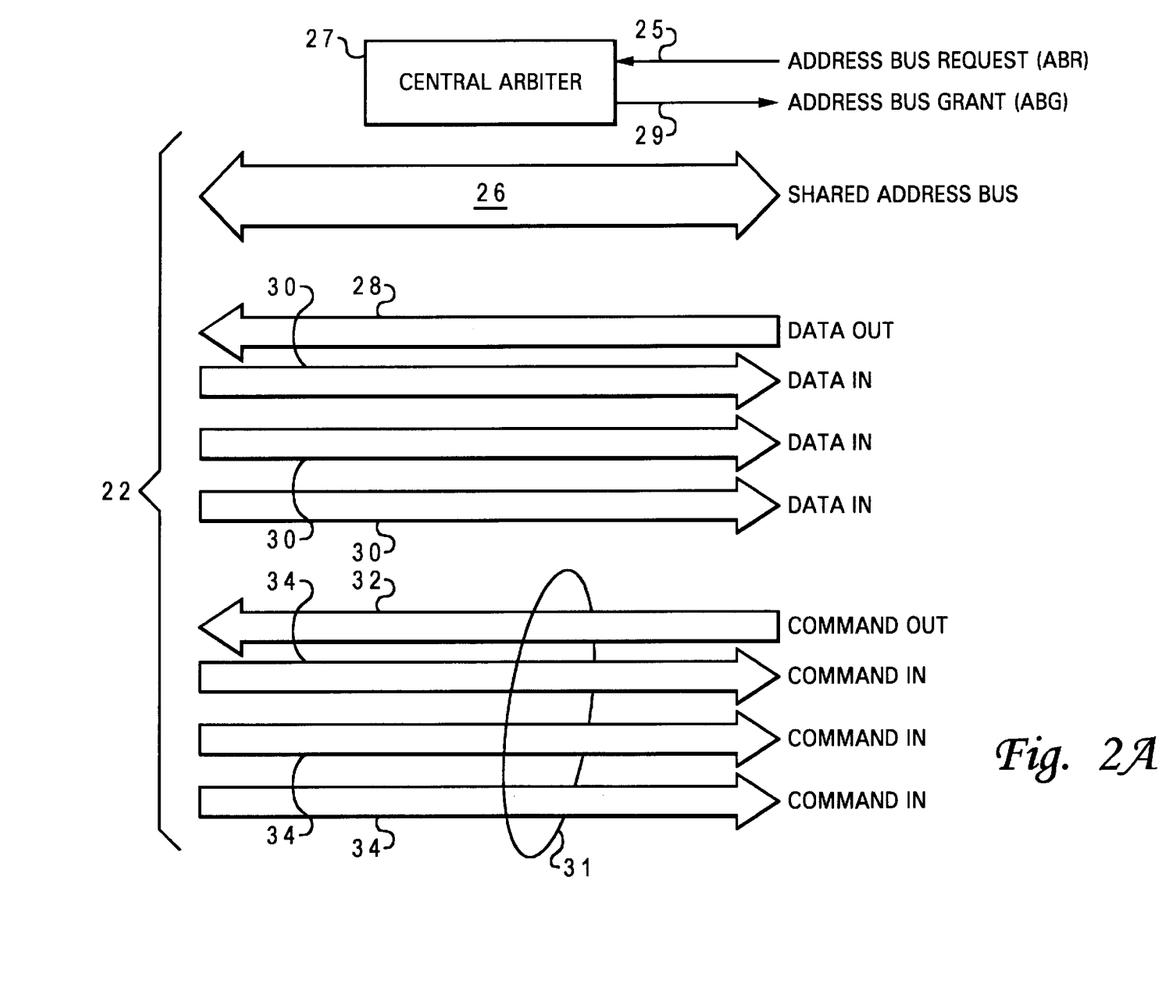
FIG. 2A is a more detailed block diagram of the node interconnect shown in FIG. 1.

Referring now to FIG. 2A, an exemplary embodiment of node interconnect 22 within NUMA computer system 8 is illustrated from the perspective of one of processing nodes 10. As shown, the illustrated embodiment of node interconnect 22 includes separate (i.e., non-multiplexed) address and data portions, which are decoupled to permit split transactions. The address portion of node interconnect 22 is implemented as a shared address bus 26, access to which is controlled by central arbiter 27. A node controller 20 requests access to shared address bus 26 by asserting its respective address bus request (ABR) signal 25 and is informed of a grant of access by central arbiter 27 through the assertion of its respective address bus grant (ABG) signal 29. Each node controller 20 coupled to node interconnect 22 also snoops all communication transactions on shared address bus 26 to support memory coherency, as discussed further below. A summary of relevant signal names and definitions for shared address bus 26 is given in Table I.

TABLE I

| Signal Name | No. of lines | Description |
| --- | --- | --- |
| Address <0:7> | 8 | Address bus modifiers defining attributes of a communication transaction for coherency, write thru, and protection |
| Address <8:15> | 8 | Tag used to identify a communication transaction |
| Address <16:63> | 48 | Address signals that indicate the physical, virtual or I/O address in a request |
| AParity <0:2> | 3 | Indicates parity for address bits <0:63> |
| TDescriptors | 10 | Indicate size and type of communication transaction |

The utilization of shared address bus 26 is preferably enhanced by implementing shared address bus 26 as a pipelined bus, meaning that a subsequent transaction can be sourced by a processing node 10 prior to the master of a previous communication transaction receiving coherency responses from each of the other processing nodes 10.

While the data portion of node interconnect 22 could also be implemented as a shared bus, the data portion of node interconnect 22 is preferably implemented as a distributed switch having N−1 (e.g., 4−1=3) data-in channels 34 and a single data-out channel 32 for each processing node 10. The data output by a processing node 10 on data-out channel 32 are transmitted to all of processing nodes 10, and each processing node 10 receives data from each of the other processing nodes 10 via data-in channels 34. By implementing the data portion of node interconnect 22 in this manner rather than as a shared bus, deadlocks are avoided and data bandwidth is advantageously increased. The relevant signal names and definitions for each channel within the preferred embodiment of the data portion of node interconnect 22 are summarized below in Table II.

TABLE II

| Signal Name | No. of lines | Description |
| --- | --- | --- |
| Data <0:127> | 128 | Data lines used to carry data for read and write transactions |
| Data parity <0:15> | 16 | Indicate parity for data lines <0:127> |
| DTag <0:7> | 8 | Tag used to match a data packet with an address bus transaction |
| DValid <0:1> | 2 | Indicate if valid information is present on Data and DTag lines |

As indicated in Table II, to permit recipients of data packets to determine the communication transaction to which each data packet belongs, each data packet is identified with a transaction tag. This permits the timings of shared address bus 26 and the data portion of node interconnect 22 to be completely decoupled, meaning that no fixed timing relationship exists between address tenures and data tenures and that data tenures can be ordered differently than the corresponding address tenures. Those skilled in the art will appreciate that data flow control logic and associated flow control signals should be utilized to regulate use of the finite data communication resources.

Figure 2B:
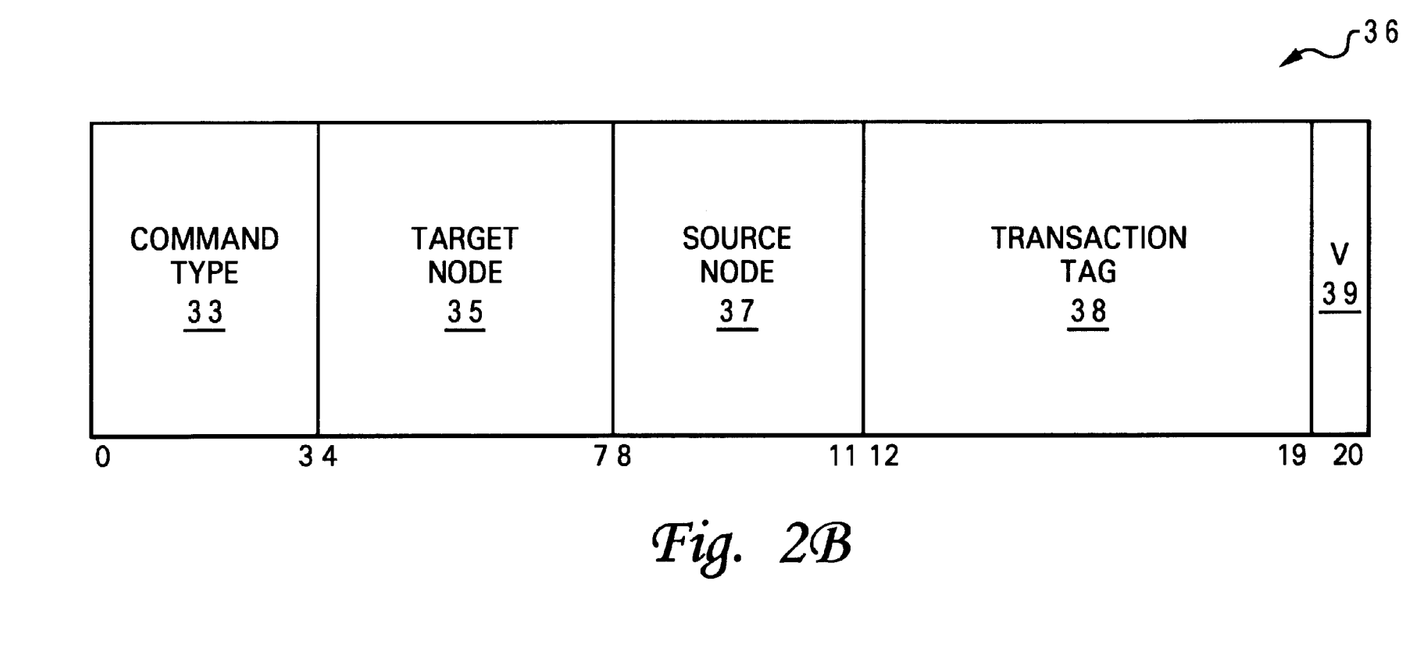
FIG. 2B depicts an illustrative embodiment of an I-command.

As illustrated in FIG. 2A, the illustrative embodiment of node interconnect 22 also includes a high speed I-command channel 31. This sideband channel, like the data portion of node interconnect 22, is preferably implemented as a distributed switch including one output channel (command-out channel 32) and N−1 input channels (command-in channels 34) for each processing node 10. Channels 32 and 34 permit the communication of I-commands between processing nodes 10 without creating additional loading on the address or data portions of node interconnect 22. An exemplary embodiment of an I-command is shown in FIG. 2B. As illustrated, I-command 36 includes five (5) fields: a 4-bit command type field 33, an N-bit (e.g., 4-bit) target node field 35, an N-bit source node field 37, a transaction tag field 38, and a valid (V) field 39. Command type field 33 provides an encoded indication of the type of I-command 36. Some of the possible I-commands that can be encoded within type field 33 are listed below in Table III.

TABLE III

| I-command groups | I-command types | Meaning |
| --- | --- | --- |
| commands | 3rd node run | Run buffered transaction at third (target) node |
| | Error | Error detected in transaction |
| | Reissue | Reissue transaction to source node |
| coherency responses | Retry | Retry transaction -- usually for flow control reasons |
| | Modified intervention | Line is modified in cache and will be sourced to target node |
| | Shared | Line is held shared in cache |
| | Null | Line is invalid in cache |
| | Retry with auto-ReRun | Retry transaction and automatically initiate ReRun |
| | Modified Intervention with auto-ReRun | Modified intervention response and automatically initiate ReRun |

TABLE III-continued

| I-command groups | I-command types | Meaning |
|---|---|---|
| | Shared with auto-ReRun | Line shared and automatically initiate ReRun |
| | Null with auto-ReRun | Line invalid in cache and automatically initiate ReRun |

For each type of I-command, the recipient is specified in target node field 35, the sending node is specified in source node field 37, and the transaction to which the I-command relates is specified within transaction tag field 38. The validity of I-command 36 is indicated by valid (V) field 39. Importantly, the I-commands issued by processing nodes 10 via I-command channel 31 do not have any necessary timing relationship with the address or data tenures of the associated communication transactions. And, because I-command channel 31 utilizes small packets and is non-blocking (i.e., use of I-command channel 31 by one processing node 10 does not inhibit or block usage by other processing nodes), I-commands can be transmitted at high speed between processing nodes 10.

Like node interconnect 22, local interconnects 16 include three distinct components—an address portion, a data portion, and a coherency portion. The address portion of each local interconnect 22 is preferably implemented as described above with respect to shared address bus 26 of node interconnect 22. The data portion of each local interconnect 16 utilizes the same data signals listed above in Table II, but is preferably implemented as a shared data bus rather than a distributed switch (although either could be utilized). In lieu of the I-command channel discussed above, the coherency portion of each local interconnect 16 includes signal lines coupling each attached snooper to the local arbiter 24. The signal lines within local interconnects 16 that are utilized for coherency communication are summarized below in Table IV.

TABLE IV

| Signal Name | No. of lines | Description |
|---|---|---|
| AStatOut <0:1> | 2 | Encoded signals asserted by each bus receiver to indicate flow control or error information to arbiter |
| AStatIn <0:1> | 2 | Encoded signals asserted by arbiter in response to tallying the AStatOut signals asserted by the bus receivers |
| ARespOut <0:2> | 3 | Encoded signals asserted by each bus receiver to indicate coherency information to arbiter |
| ARespIn <0:2> | 3 | Encoded signals asserted by arbiter in response to tallying the ARespOut signals asserted by the bus receivers |

In contrast to the coherency responses transmitted between processing nodes 10 via I-command channel 31, coherency responses transmitted via the AResp and AStat lines of local interconnects 16 preferably have a fixed but programmable timing relationship with the associated address bus transactions. For example, the AStatOut votes, which provide a preliminary indication of the response of each snooper to a communication transaction on the local address bus, may be required in the second cycle following receipt of a request on the local address bus. Arbiter 24 compiles the AStatOut votes and then issues the AStatIn vote a fixed but programmable number of cycles later (e.g., 1 cycle). Possible AStat votes are summarized below in Table V.

TABLE V

| AStat vote | Meaning |
|---|---|
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed above in Table III. In addition, the possible AResp votes include "ReRun," which is issued (usually by a node controller 20) to indicate that the snooped request has a long latency and that the source of the request will be instructed to reissue the transaction at a later time. Thus, in contrast to a retry response, a ReRun response makes the recipient of a transaction that voted ReRun (and not the originator of the transaction) responsible for causing the communication transaction to be reissued at a later time.

Node Controller

Figure 2C:
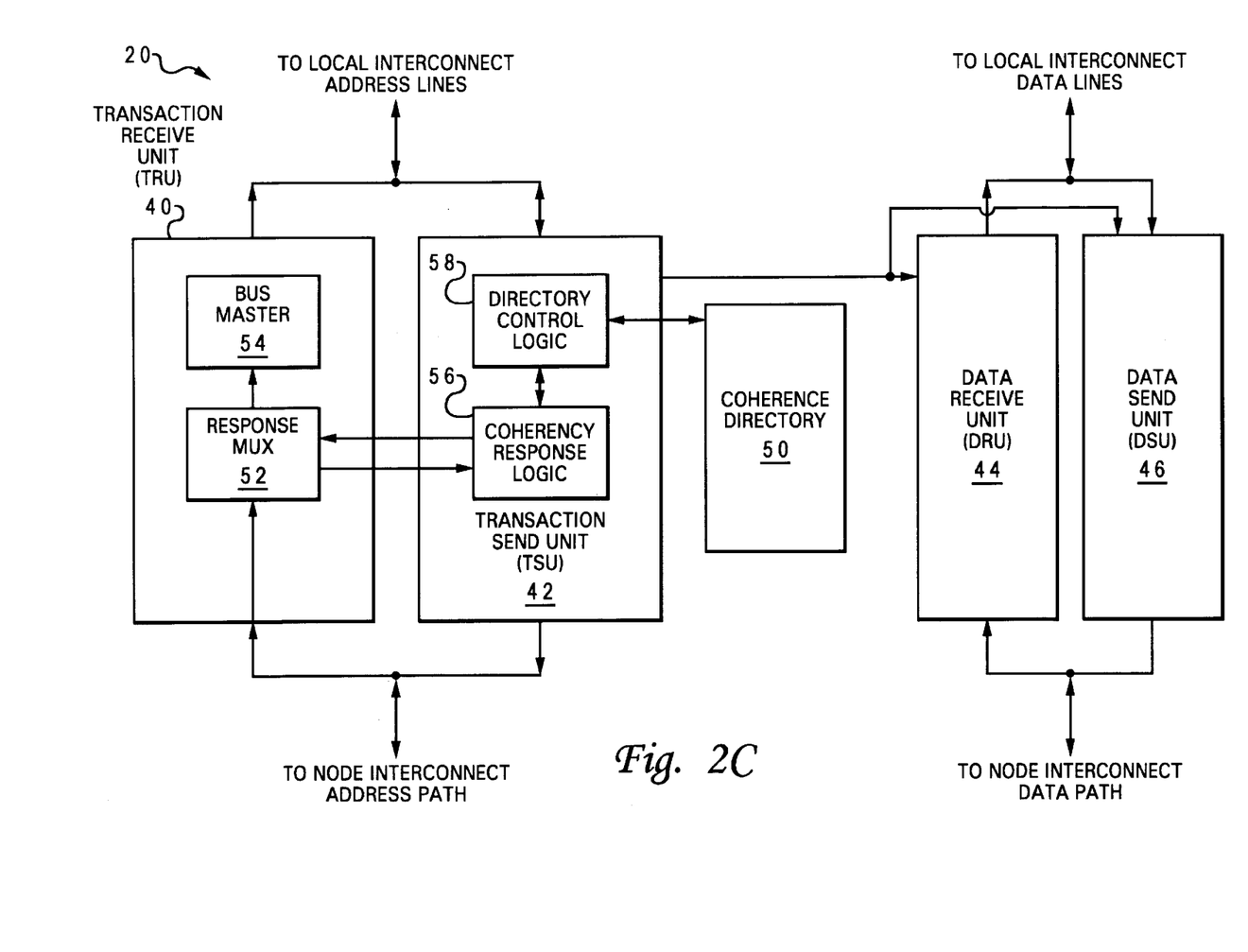
FIG. 2C is a more detailed block diagram of the node controller shown in FIG. 1.

Referring now to FIG. 2C, there is illustrated a more detailed block diagram of a node controller 20 in NUMA computer system 8 of FIG. 1. As shown in FIG. 2C, each node controller 20, which is coupled between a local interconnect 16 and node interconnect 22, includes transaction receive unit 40, transaction send unit 42, a data receive unit (DRU) 44, and a data send unit (DSU) 46. Transaction receive unit 40, transaction send unit 42, DRU 44 and DSU 46 can be implemented, for example, with field programmable gate arrays (FPGAs) or application specific integrated circuits (ASICs). As indicated, the address and data paths through node controller 20 are bifurcated, with address signals being processed by transaction receive unit 40 and transaction send unit 42 and data signals being processed by DSU 44 and DRU 46.

Transaction receive unit 40, which is so designated to indicate transaction flow off of node interconnect 22, is responsible for receiving I-commands from other nodes via I-command channel 31, accepting transactions from shared address bus 26 of node interconnect 22, issuing transactions on local interconnect 16, and forwarding responses to transaction send unit 42. Transaction receive unit 40 includes response multiplexer (mux) 52, which receives transactions from node interconnect 22 and passes selected transactions to both bus master 54 and coherency response logic 56 within transaction send unit 42, as discussed in greater detail below. In response to receipt of a communication transaction from response multiplexer 52, bus master 54 can initiate a communication transaction on its local interconnect 16 that is the same as or different from the received communication transaction.

Transaction send unit 42, which as indicated by its nomenclature is a conduit for transactions flowing onto node interconnect 22, interacts with transaction receive unit 40 to process memory request transactions and issues commands to DRU 44 and DSU 46 to control the transfer of data between local interconnect 16 and node interconnect 22. Transaction send unit 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each datum is stored in association with an identifier of each remote processing node having a copy of the datum and the coherency status of the datum at each such remote processing node. Possible coherency states for entries in coherency directory 50 are summarized in Table VI.

TABLE VI

| Coherence directory state | Possible state (s) in local cache | Possible state (s) in remote cache | Meaning |
| --- | --- | --- | --- |
| Modified (M) | I | M,E, or I | Cache line may be modified at a remote node with respect to system memory at home node |
| Shared (S) | S or I | S or I | Cache line may be held non-exclusively at remote node |
| Invalid (I) | M,E,S, or I | I | Cache line is not held by any remote node |
| Pending-shared | S or I | S or I | Cache line is in the process of being invalidated at remote nodes |
| Pending-modified | I | M,E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

Low Latency Communication Methodology

Figure 3A:
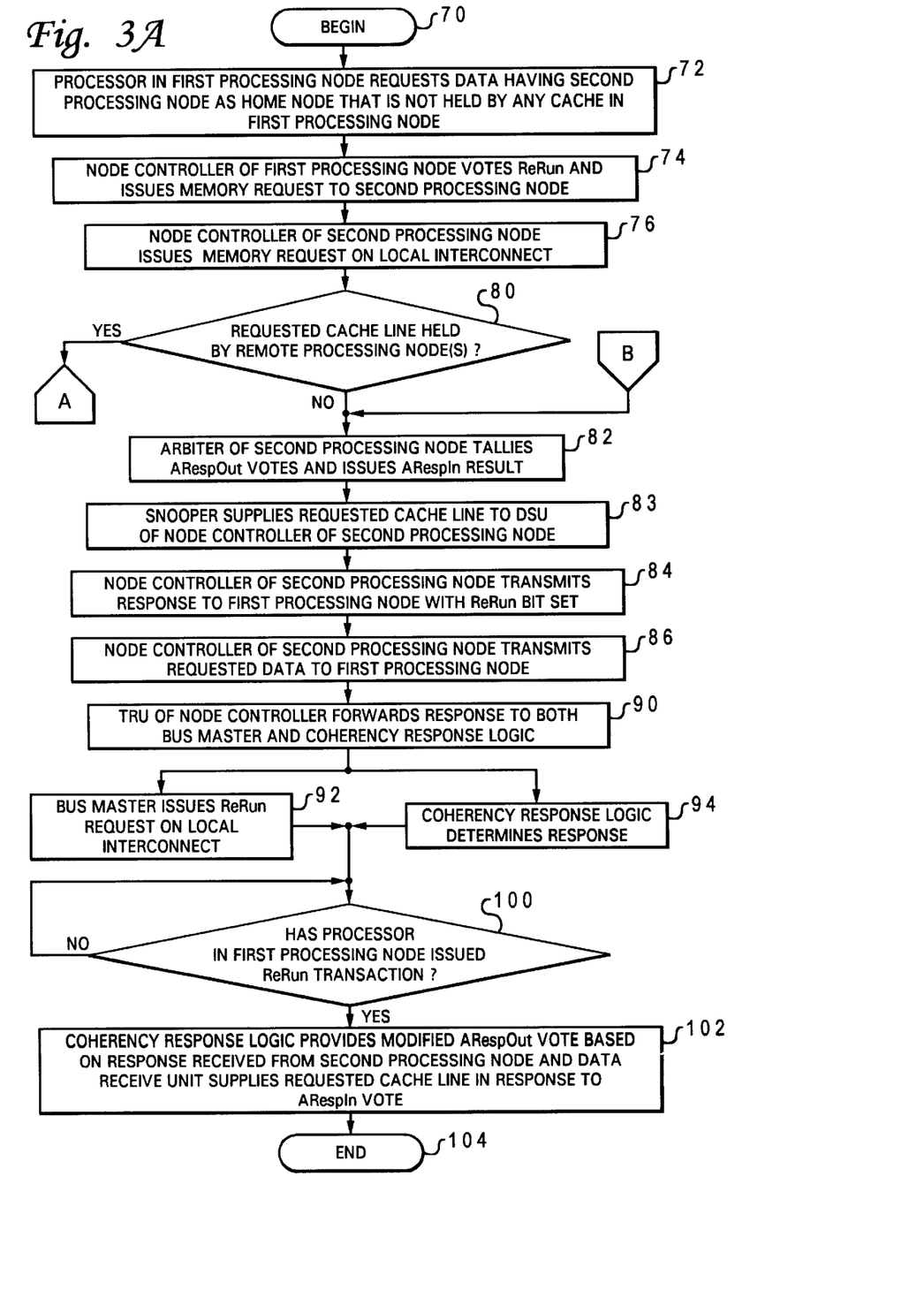
FIGS. 3A and 3B together form a high level logical flowchart of a method of communication in a NUMA computer system in accordance with the present invention.

With reference now to FIG. 3A, there is illustrated a high level logical flowchart of an exemplary low latency communication methodology for a NUMA computer system in accordance with an illustrative embodiment of the present invention. It is important to note that although the communication methodology is described below with specific reference to the embodiment of node interconnect 22 described above, the communication methodology is equally applicable to the other implementations of node interconnect 22 discussed above.

As depicted, the process begins at block 70 and thereafter proceeds to block 72, which illustrates a processor 12 in first processing node 10a issuing a communication transaction on its local interconnect 16 requesting data (i.e., a cache line) that is not held by any cache in first processing node 10a and that has second processing node 10b as a home node. The communication transaction may be a read with intent to modify (RWITM) transaction, for example, which indicates that the requesting processor 12 desires exclusive ownership of the requested cache line for purposes of modifying it. As described above, in response to receiving the communication transaction, each snooper coupled to local interconnect 16 provides an AStatOut vote and thereafter an ARespOut vote. As depicted at block 74, node controller 20 of first processing node 10a votes ReRun during the ARespOut period to indicate that the address of the requested cache line does not fall within the physical address space allocated to local system memory 18. Because none of the caches in first processing node 10a stores a copy of the requested cache line, the remainder of the ARespOut votes are Null. In response to receipt of the ARespOut votes, arbiter 24 of first processing node 10a compiles the votes and votes ReRun during the ARespIn period. As further indicated at block 74, in response to receipt of the ReRun vote from arbiter 24, node controller 20 of first processing node 10a transmits the communication transaction (e.g., RWITM) on shared address bus 26 of node interconnect 22, requesting the cache line from second processing node 10b.

The process then proceeds from block 74 to block 76, which depicts node controller 20 of second processing node 10b arbitrating for ownership of its local interconnect 16 and issuing the RWITM communication transaction on local interconnect 16. In response to snooping the RWITM communication transaction on local interconnect 16, each snooper within second processing node 10b provides the appropriate AStatOut and ARespout votes. As shown at block 80, the determination of the appropriate ARespOut vote entails coherency response logic 56 of transaction send unit 42 determining whether the request can be serviced locally or whether other processing nodes must be involved due to the requested cache line being held remotely. Coherency response logic 56 determines whether a remote processing node holds the requested cache line by reference to coherence directory 50. In response to a determination that the requested cache line is not held by a remote processing node, the process proceeds to block 82, which is described below. However, in response to a determination that at least one remote processing node holds the requested cache line, the process passes through off-page connector A to FIG. 3B.

Figure 3B:
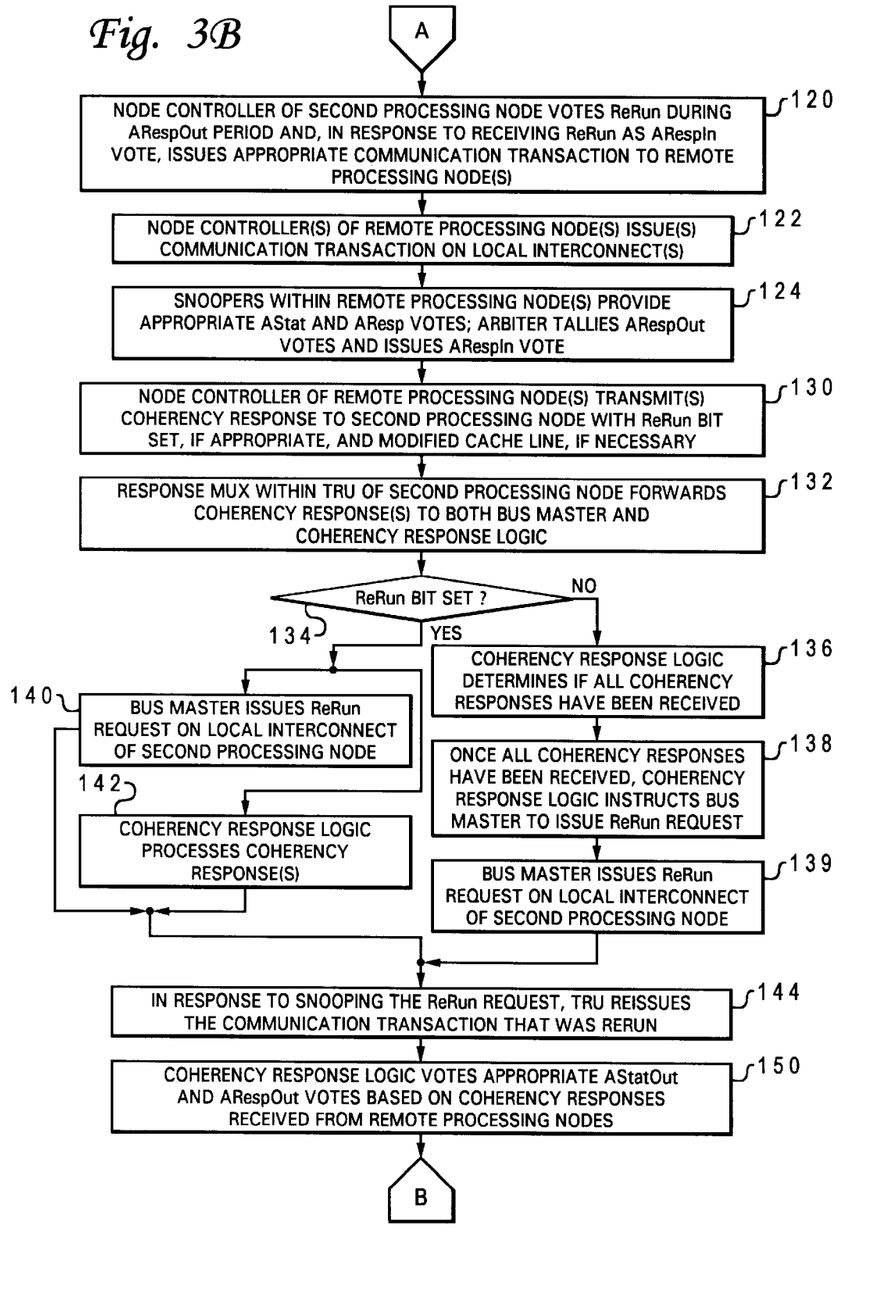

Referring now to FIG. 3B, the process illustrated in FIG. 3A continues from on-page connector A to block 120. Block 120 depicts transaction send unit 42 of node controller 20 within second processing node 10b voting ReRun for its ARespOut vote for the request transaction. The ReRun vote indicates that transaction send unit 42 has determined by reference to coherence directory 50 that the coherency status of the requested cache line cannot be resolved and the requested cache line cannot be obtained without involving one or more remote processing nodes. In response to receipt of a ReRun ARespIn vote from arbiter 24 of second processing node 10b, transaction send unit 42 of second processing node 10b issues an appropriate communication transaction on shared address bus 26 of node interconnect 22 to resolve the request of first processing node 10a. For example, in a case in which a remote processing node, such as third processing node 10c, holds the requested cache line exclusively and first processing node 10a issued a RWITM transaction, transaction send unit 42 issues a RWITM transaction targeting third processing node 10c. This scenario is known as a "third node" scenario because the requested cache line is not held by the requesting node or the home node, but is instead indicated by coherency directory 50 as being held in M state by a third node. If, on the other hand, cache directory 50 of second processing node 10b indicates that one or more remote processing nodes hold the requested cache line in Shared state, transaction send unit 42 of second processing node 10b issues a Dclaim transaction targeting all remote processing nodes holding the requested cache line in Shared state. The Dclaim transaction instructs the remote processing nodes to invalidate their local copies of the requested cache line and indicate such invalidation with a Null coherency response.

The process then proceeds from block 120 to block 122, which illustrates the node controller 20 of each remote processing node targeted by the communication transaction issued by second processing node 10b issuing a corresponding communication transaction (i.e., a RWITM transaction or a Dclaim transaction) on its respective local interconnect 16. Then, as depicted at block 124, each snooper within the remote processing node(s) in which a communication transaction was issued at block 122 provides appropriate AStatOut and ARespOut votes. If the communication transaction issued at block 122 is a RWITM transaction, the cache storing the requested cache line votes either Null, indicating that the requested cache line is unmodified and will be invalidated, or Modified, indicating that the requested cache line was modified and that the cache will source the requested cache line and invalidate its copy. Alternatively, if the communication transaction issued at block 122 is a Dclaim, each cache holding the requested cache line votes a Null response during the ARespOut period to indicate that the requested cache line has been invalidated in that cache. The arbiter 24 at each remote processing node running a communication transaction tallies the votes from the snoopers and issues an ARespIn vote. In a "third node" scenario in which the requested cache line has been modified, the cache holding the modified cache line also sources the modified cache line to its local node controller 20 via local interconnect 16.

As illustrated at block 130, in response to receipt of the ARespIn coherency vote and, if the requested cache line was modified, the modified cache line, the node controller 20 of each remote processing node involved in the resolution of the request of first processing node 10a transmits its coherency response to second processing node 10b via I-command channel 31. (In an alternative embodiment in which node interconnect 22 is implemented as a switch-based interconnect structure, each coherency response is preferably a high priority packet that is transmitted to second processing node 10b via a virtual I-command channel.) The modified cache line, if any, is transmitted by DSU 46 of the third node to DRU 44 of second processing node 10b via data-out channel 28. In accordance with the present invention, an I-command coherency response transmitted at block 130 is one of the coherency responses with auto-ReRun (listed above in Table III) only if the coherency response is the only expected coherency response. Accordingly, in this illustrative embodiment, command type field 33 specifies a coherency response with auto-ReRun in cases in which the coherency response is transmitted from a home node to a requesting node or from a third node to a home node in a "third node" scenario. In an alternative embodiment, the I-command can be augmented with an additional field that specifies how many coherency responses are expected to a communication transaction. If this additional information is included within coherency responses (and furnished to the responding node in the communication transaction on node interconnect 22), every coherency response to a communication transaction issued in response to a ReRun vote on a local interconnect 16 would be a coherency response with auto-ReRun. For ease of decoding, the distinction between a particular coherency response and the corresponding coherency response with auto-ReRun is preferably indicated by the state of a single bit in command type field 33. This bit will hereinafter be referred to as the ReRun bit.

Returning to FIG. 3B, following block 130 the process passes to block 132. Block 132 illustrates response mux 52 within transaction receive unit 40 of second processing node 10b forwarding each received coherency response to both bus master 54 and coherency response logic 56 within transaction send unit 42. As indicated at block 134, bus master 54 and coherency response logic 56 determine if the ReRun bit of the coherency response is set. If the ReRun bit is set, bus master 54 is responsible for determining when to reissue a ReRun request on local interconnect 16 of second processing node 10b; however, if the ReRun bit is reset, coherency response logic 56 is responsible for determining when to issue the ReRun request. Therefore, if the ReRun bit is reset, the process proceeds from block 134 to blocks 136 and 138, which illustrate coherency response logic 56 determining (e.g., by reference to coherency directory 50) if all expected coherency responses have been received from remote processing nodes and, once all expected coherency responses have been received, instructing bus master 54 to reissue the ReRun request on local interconnect 16. Thus, at block 139, bus master 52 issues a ReRun request that instructs the master that ran the request transaction to reissue the request transaction.

Alternatively, if the ReRun bit is set in the coherency response(s), the process proceeds from block 134 to both block 140 and block 142, thereby illustrating that the functions depicted at blocks 140 and 142 are performed concurrently. Thus, bus master 54 issues a ReRun request on local interconnect 16 of second processing node 10b while coherency response logic 56 determines from the received coherency response(s) the appropriate coherency response to the ReRun transaction. Importantly, by performing the functions illustrated at blocks 140 and 142 concurrently, communication latency is reduced.

The process then proceeds to block 144, which illustrates transaction receive unit 40 snooping the ReRun request. Transaction receive unit 40 responds by reissuing the RWITM communication transaction on local interconnect 16 of second processing node 10b. In an alternative embodiment of the present invention, bus master 54 simply reissues the RWITM communication transaction at either block 139 or block 140 without performing the additional steps illustrated at block 144. These steps are optionally included within the process shown in FIG. 3B so that the handling of ReRun coherency responses is consistent at the home node (i.e., second processing node 10b) and at the requesting node (i.e., first processing node 10a).

In response to snooping of the reissued RWITM transaction, each snooper on local interconnect 16 of second processing node 10b responds with appropriate AStat and AResp votes. As illustrated at block 150, coherency response logic 56 responds with AStat and AResp votes determined from the coherency response(s) received from the remote processing node(s). Thus, if the requested cache line was modified remotely, meaning that coherency response logic received a Modified response from a single remote processing node, coherency response logic 56 votes Modified during the ARespOut period. Alternatively, if the requested cache line was not modified remotely, all snoopers except system memory 18 vote Null during the ARespout period. Thereafter, the process returns to FIG. 3A via off-page connector B.

With reference again to FIG. 3A, the process proceeds from either block 80 or on-page connector B to block 82. Block 82 illustrates arbiter 24 of second processing node 10b compiling the ARespOut votes and issuing an ARespIn vote. As shown at block 83, in response to receipt of the ARespIn vote, a snooper (which is node controller 20 if the requested cache line was modified remotely) sources the requested cache line to DSU 46 of node controller 20. In addition, as depicted at block 84, transaction send unit 42 within node controller 20 of second processing node 10b transmits a coherency response to first processing node 10a via I-command channel 31. As discussed supra with respect to block 130, the coherency response preferably has the format shown in FIG. 4 and has the ReRun bit set. The process then proceeds from block 84 to block 86, which illustrates DSU 46 within node controller 20 of second processing node 10b transmitting the requested cache line to first processing node 10a via the data lines of node interconnect 22.

The coherency response issued by second processing node 10b is received by response mux 52 within node controller 20 of first processing node 10a, and the requested cache line is received by DRU 44. Response mux 52 forwards the coherency response to both bus master 54 and coherency response logic 56, as shown at block 90. As described supra with respect to blocks 140 and 142, the coherency response is concurrently processed by bus master 54 and coherency response logic 56, as depicted at blocks 92 and 94. In response to receipt of the coherency response having the ReRun bit set, bus master 54 issues a ReRun request on local interconnect 16 of first processing node 10a instructing the snooper that originally issued the request transaction to reissue the same request transaction, which is identified in the ReRun request by its transaction tag. Meanwhile, coherency response logic 56 determines the appropriate AStat and AResp votes to give when the reissued request transaction is snooped.

The process then proceeds to block 100, which illustrates waiting until the requesting snooper reissues the request transaction on local interconnect 16 of first processing node 10a. In response to the requesting snooper reissuing the request transaction, all snoopers on local interconnect 16 provide appropriate AStat and AResp votes. As shown at block 102, coherency response logic 56 of first processing node 10a votes Modified during the ARespOut period. Arbiter 24 of first processing node 10a then compiles the ARespOut votes and issues a Modified ARespIn vote, which is detected by transaction send unit 42. Transaction send unit 42 then signals DRU 44 to source the requested cache line to the requesting processor via local interconnect 16 of first processing node 10a. Thereafter, the process terminates at block 104.

As has been described, the present invention provides an improved NUMA computer system and method of communication in which communication latency is reduced by expediting ReRun requests. In accordance with the above-described method, each coherency response from a remote processing node contains a ReRun field that indicates if the coherency response is a reply to a communication transaction originated in response to a ReRun at the local processing node. If the ReRun field is set, a communication transaction (e.g., a ReRun request) is initiated on the local interconnect of the recipient processing node by the node controller's bus master concurrently with the processing of the coherency response by coherency response logic. In this manner, a ReRun transaction can be initiated in response to a ReRun reply without waiting for the coherency response logic to update the coherency state and without any additional latency attributable to communication between the node controller's coherency response logic and bus master. No additional logic is required to ensure that the communication transaction triggered by the ReRun request is not reissued prior to the coherency logic updating the coherency state since the latency of the coherency logic can be guaranteed to be less the aggregate latency associated with issuing the ReRun request and ReRunning the communication transaction.

While the invention has been particularly shown and described with reference to a preferred embodiment, it will be understood by those skilled in the art that various changes in form and detail may be made therein without departing from the spirit and scope of the invention. For example, although the present invention has been described with reference to an illustrative embodiment in which the node interconnect is implemented, at least in part, as a shared, blocking fabric, it should be understood that the present invention is equally applicable to alternative embodiments in which the node interconnect is implemented with a point-to-point non-blocking fabric such as a cross-bar switch.

What is claimed is:

1. A non-uniform memory access (NUMA) computer system, comprising:

a node interconnect; and a plurality of processing nodes that each include at least one processor, a local interconnect, a local system memory, and a node controller, each node controller being coupled to both a respective local interconnect and said node interconnect;

wherein a node controller, responsive to receipt of at least one of a plurality of remote responses from said node interconnect that each contain a coherency response field, each of said plurality of remote responses comprising a response issued by a remote node among said plurality of processing nodes in response to a memory request issued by a node controller in a local node among said plurality of processing nodes, issues a Rerun request on its respective local interconnect concurrently with processing said plurality of remote responses to determine a local coherency response of said node controller only if a set ReRun field is detected in said plurality of remote responses.

2. The NUMA computer system of claim 1, each node controller comprising:

local interconnect master logic that issues said request on said local interconnect; and coherency logic that determines a coherency response indicated by said coherency response field.

3. A method of operating a non-uniform memory access (NUMA) computer system including a local processing node and a remote processing node that are both coupled to a node interconnect, each of said local and remote processing nodes including a local interconnect, said method comprising:

transmitting a memory request on said node interconnect from said local processing node to a plurality of remote processing nodes;

in response to receipt of said communication transaction by said plurality of remote processing nodes, transmitting a plurality of responses on said node interconnect from said plurality of remote nodes to said local node, said plurality of responses each including a coherency response field; and in response to receipt of at least one of said plurality of responses at said local node, issuing a ReRun request on said local interconnect of said local node concurrently with processing said plurality of responses to determine a local coherency response only if a set ReRun field is detected in said plurality of responses.

* * * * *

UNITED STATES PATENT AND TRADEMARK OFFICE
CERTIFICATE OF CORRECTION

PATENT NO. : 6,085,293
DATED : July 4, 2000
INVENTOR(S) : Carpenter et al.

It is certified that error appears in the above-identified patent and that said Letters Patent are hereby corrected as shown below:

In Col. 13, line 3, please replace "FIG. 4" with -- FIG. 2B --, as amended.

Signed and Sealed this

Tenth Day of April, 2001

*Attest:*

NICHOLAS P. GODICI

*Attesting Officer*     *Acting Director of the United States Patent and Trademark Office*